(12) United States Patent
Van De Vrie et al.

(10) Patent No.: US 10,994,474 B2
(45) Date of Patent: May 4, 2021

(54) METHOD FOR PRINTING A THREE-DIMENSIONAL LIGHT GUIDING STRUCTURE BY CURING DROPLETS OF A PRINTING MATERIAL BY LIGHT IRRADIATION

(71) Applicant: LUXEXCEL HOLDING B.V., Kruiningen (NL)

(72) Inventors: Richard Van De Vrie, Wolphaartsdijk (NL); Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 225 days.

(21) Appl. No.: 15/102,369

(22) PCT Filed: Dec. 19, 2014

(86) PCT No.: PCT/EP2014/078862
§ 371 (c)(1),
(2) Date: Jun. 7, 2016

(87) PCT Pub. No.: WO2015/092016
PCT Pub. Date: Jun. 25, 2015

(65) Prior Publication Data
US 2016/0311157 A1    Oct. 27, 2016

(30) Foreign Application Priority Data
Dec. 20, 2013    (EP) ..................... 13199247

(51) Int. Cl.
*B29C 64/00*    (2017.01)
*B29D 11/00*    (2006.01)
(Continued)

(52) U.S. Cl.
CPC .......... *B29C 64/112* (2017.08); *B29C 64/129* (2017.08); *B29C 67/007* (2013.01);
(Continued)

(58) Field of Classification Search
CPC .............. B29C 67/0088; B29C 67/007; B29C 67/0059; B29D 11/00961; B29D 11/00663; G02B 6/138; G02B 19/0019
See application file for complete search history.

(56) References Cited

U.S. PATENT DOCUMENTS 5,498,444 A  *  3/1996  Hayes ..................... B29C 41/36
347/1
5,960,853 A      10/1999  Sterett et al.
(Continued)

FOREIGN PATENT DOCUMENTS

| EP | 1372005 A2 | 12/2003 |
|----|------------|---------|
| EP | 1864785 A1 | 12/2007 |
| WO | 2010/091888 A1 | 8/2010 |

OTHER PUBLICATIONS

Search Report and Written Opinion for Application No. PCT/EP2014/078862 dated Mar. 16, 2015.
(Continued)

*Primary Examiner* — Mathieu D Vargot
(74) *Attorney, Agent, or Firm* — The Dobrusin Law Firm, P.C.

(57) ABSTRACT

The present invention relates to a method for printing a three-dimensional light guiding structure (1) by curing droplets (7) of a printing material by light irradiation, wherein in a first step the droplets (7) of printing material are deposited by a nozzle (30) or a print head of an inkjet printer such that the droplets (7) of printing material form a layer (10) and in a second step light is directed from a light source to an array (5), wherein the array (5) comprises a plurality of mirror elements (6), wherein at least one mirror element (6) of the array (5) can be orientated such that the at least one mirror element (6) of the array (5) reflects in directly or directly
(Continued)

light either onto a screen (3) or onto the layer (10) formed by the droplets (7) of printing material.

15 Claims, 3 Drawing Sheets

(51) Int. Cl.
    *B29C 64/112*    (2017.01)
    *B33Y 10/00*    (2015.01)
    *B29C 64/129*    (2017.01)
    *B33Y 30/00*    (2015.01)
    *B33Y 50/02*    (2015.01)
    *B33Y 80/00*    (2015.01)
    *B29C 67/00*    (2017.01)
    *G02B 19/00*    (2006.01)
    *G02B 6/138*    (2006.01)
    *G02B 6/12*    (2006.01)
    *B29L 11/00*    (2006.01)

(52) U.S. Cl.
    CPC .. *B29D 11/00663* (2013.01); *B29D 11/00961* (2013.01); *B33Y 10/00* (2014.12); *B33Y 30/00* (2014.12); *B33Y 50/02* (2014.12); *B33Y 80/00* (2014.12); *G02B 19/0019* (2013.01); *G02B 19/0095* (2013.01); *B29L 2011/0075* (2013.01); *G02B 6/12002* (2013.01); *G02B 6/138* (2013.01)

(56) References Cited

U.S. PATENT DOCUMENTS

| | | | | |
|---|---|---|---|---|
| 6,145,979 A | * | 11/2000 | Caiger | B41J 11/002 347/102 |
| 6,562,413 B1 | * | 5/2003 | Morgavi | B41J 11/002 204/157.44 |
| 7,197,201 B2 | * | 3/2007 | Nakaya | G02B 6/136 385/129 |
| 8,317,505 B2 | * | 11/2012 | Widman | B29D 11/00009 425/174.4 |
| 2004/0134880 A1 | * | 7/2004 | Afromowitz | B29C 33/3842 216/26 |
| 2005/0288813 A1 | | 12/2005 | Yang et al. | |
| 2009/0133800 A1 | | 5/2009 | Morohoshi et al. | |
| 2010/0003619 A1 | | 1/2010 | Das et al. | |

OTHER PUBLICATIONS

Jia-Chang Walla et al., *Applying the one-column, many pencil local scanning maskless lithograpghy technology to micro-RP system*, International Journal of Advanced Manufacturing Technology, vol. 41, No. 7-8, pp. 727-733 (May 7, 2008).

* cited by examiner

METHOD FOR PRINTING A THREE-DIMENSIONAL LIGHT GUIDING STRUCTURE BY CURING DROPLETS OF A PRINTING MATERIAL BY LIGHT IRRADIATION

BACKGROUND

The present invention relates to a method for printing a three-dimensional structure by depositing a plurality of droplets of printing material onto a substrate. A suchlike method is already known from the international patent application WO 2010/091888 A1 and can successfully be used for printing light-directing structures, for instance.

Printing light-directing structures needs a high level of accuracy with respect to depositing and curing the droplets, wherein UV-light is a powerful tool for curing the droplets. However, using UV-light entails some drawbacks. Firstly you are restricted to components for light guiding suitable for UV-light. For example it is necessary to use lenses made from quartz in order to avoid damages in lenses guiding UV-light. Secondly it is desirable that the UV-light changes its intensity or beam profile during the printing process, for example. As result the components for light guiding has to be adapted for each curing process, in particular during the curing process. It is also considerable that components have to be replaced in a time consuming way in order to realize the desired intensity profile.

SUMMARY

It is therefore an object of the present invention to provide a method for printing a three-dimensional light guiding structure, wherein the light used for curing the droplets of printing material is manipulated such that the properties of the light can be changed easily, flexibly and fast.

The object is solved by a method for printing a three-dimensional light guiding structure by curing droplets of a printing material by light irradiation, wherein in a first step the droplets of printing material are deposited by a nozzle or a print head of an inkjet printer such that the droplets of printing material form a layer and wherein in a second step light is directed from a light source to an array, wherein the array comprises a plurality of mirror elements and/or a fiber mean, wherein at least one mirror element of the array and/or the fiber mean can be orientated such that the at least one mirror element of the array and/or the fiber mean reflects indirectly or directly light either onto a screen or onto the layer formed by the droplets of printing material.

It is herewith advantageously possible to cure the droplets of printing material using light that is adjustable in a flexible and fast fashion. As a result the light may be adjusted such that the printing process is accelerated and/or the curing is controlled more precisely compared to the state of the art. In particular it is provided that the plurality of mirror elements can be orientated such that each of the mirror elements reflects directly or indirectly light either onto the screen or onto the layer, respectively. Preferably the screen is absorbing and the light source is a UV-light source. Furthermore it is provided that the array of mirror elements is integrated in a microchip, in particular in a DLP-chip, and at least one of the mirror elements is connected to a computer via an interface. Moreover it is thinkable that a plurality of arrays and a plurality of light sources are used for curing the same set of droplets forming the layer. As a result a high curing power is achievable. Preferably it is provided that the array of mirror elements, particularly the microchip or the DLP-chip, is watercooled. Moreover it is thinkable that the array of mirror elements is arranged on a moveable, preferably rotatable, plate. As a result it is possible to move, in particular rotate, the array of the mirror elements during the printing process. It is considerable that at least one mirror element is adjustable in a first position or in a second position, wherein light is reflected by the mirror element in the second position onto the layer directly or indirectly and light is reflected by the mirror element in the first position onto the screen. It is also considerable that the mirror element is also adjustable in a third position, wherein the light is reflected by the mirror element in the third position onto the layer directly or indirectly and wherein the spot of the layer illuminated by light from the mirror element in the third position is different from the spot of the layer illuminated by light from the mirror element in the second position. Preferably the printing ink comprises an UV curable liquid monomer which becomes a polymer by curing. It is further conceivable that the printing material have different colors. Furthermore it is provided to use a printing head for depositing the droplets of printing material. Furthermore the printing material has a viscosity. Consequently the droplets of the material may spread or diffuse. In such a scenario it is considerable that the mirror elements are orientated such that the light follows the diffusing droplets of printing material. For construction a three-dimensional light-guiding structure it is provided that a plurality of layers are deposited and cured repeatedly and as a result the three-dimensional light-guiding structure grows. It is considerable that the light is adjusted according to the present invention in order to take into account such a growth of the three-dimensional light-guiding structure during its manufacturing. It is also conceivable that the fiber mean is made out of quartz or contains a saline solution. Using fibers has the advantage of guiding light in a flexible way. An further advantage of using fibers is to place the light source in such a distance from the printing head or the printing material that no heat effect caused by the light source may influence the printing process. In particular the light is reflected inside the fiber mean. It is also thinkable that a output of the fiber is movable arranged over the layer of printing material.

According to a preferred embodiment of the present invention it is provided that the mirror elements of the array and/or the fiber mean are arranged such that an inhomogeneous intensity profile is generated in a plane including the layer formed by the droplets of printing material. In particular the intensity at a first location of the layer is different from the intensity at a second location of the layer. It is herewith advantageously possible to adjust the intensity of the light across the beam spot illuminating the layer with respect to the requirements of curing, wherein the intensity location dependent. For example the droplets of printing material are not distributed homogenously and consequently the thickness of the layer varies. The presented embodiment of the present invention is able to realize an intensity profile that takes such an inhomogeneous distribution of printing material into account. Therefore it is possible to cure the printing material such that the curing process is finished all over the layer at the same time, mainly.

According to a preferred embodiment of the present invention it is provided that the mirror elements of the array and/or the fiber mean are orientated during the process of printing the three-dimensional light guiding structure, in particular during illuminating the layer, which is formed by the droplets of printing material. As a result it is possible to cure the printing material using a time dependent intensity profile, i.e. an intensity profile changing with time. An advantage of a time dependent intensity profile is to optimize and accelerate the curing process without damaging the printed material that has been already cured.

According to a preferred embodiment of the present invention it is provided that the light source emits cw or pulsed UV-light and/or wherein a plurality of light source is used. Preferably the light of the plurality light source is injected to the fiber mean or a second fiber mean that guides light from the plurality of light sources to the array of mirror elements. In particular it is provided that the mirror elements are rearranged or re-orientated during the time period between two UV-light pulses. Such a phasing may further accelerate the printing process, advantageously. In particular the light source emits light having a wavelength below 400 nm. Moreover it is provided that the light source is a laser. In particular it is conceivable that the light of one or more lasers generate a pattern in a plane parallel to the layer formed by the droplets of printing material or onto a screen. For instance the pattern is generated by orientation of the mirror elements and/or in combination with a second laser such as an excimer laser. It is also conceivable that interference effects cause the pattering and therefore a pattern may be generated having a preferably small structure advantageously. According to a preferred embodiment of the present invention it is provided that the orientation of each mirror element and/or the fiber mean is computer-controlled. An advantage of this embodiment is the automation of the printing process. Further it is considerable that a detection device is arranged such that the curing process of the printing material is observable and the detection device shares information with a control device controlling also the mirror elements, such as a personal computer. As a result it may be possible to realize a printing method, wherein the mirror elements are orientated in response to the information that the control device got from the detection device. In particular the mirror elements are orientated such that the light for curing the droplets of printing material compensates stochastically distributed fluctuation of the layer position.

According to a preferred embodiment of the present invention it is provided that the mirror elements of the array and/or the fiber mean are orientated such that the intensity profile comprises a first section and a second section, wherein a first intensity of the first section differs from a second intensity of the second section. Therefor it is advantageously possible to cure the droplets in the first section of the layer faster than the droplets of printing material in the second section provided that the first intensity is greater than the second intensity, for instance.

According to a preferred embodiment of the present invention it is provided that the mirror elements and/or the fiber mean are arranged such that the intensity profile comprises a third section, wherein the third section is placed between the first section and the second section, and wherein the intensity of the third section gradually changes from the first intensity to the second intensity, mainly. It is advantageously possible to realize a smooth and continuously changing intensity profile and avoid intensity jumps across the intensity profile, wherein such intensity jumps are undesirable during the curing process.

According to a preferred embodiment of the present invention it is provided that the mirror elements and/or the fiber mean are orientated such that the intensity profile corresponds to a cross section of the three-dimensional light structure. As a consequence the three-dimensional light-guiding structure is generated as a result of the light profile advantageously, because only the illuminated sections of the layer are cured. Further it is provided that the uncured droplets of the printing material are removed after curing.

According to a preferred embodiment of the present invention it is provided that at least one mirror element and/or the fiber mean is orientated such that the light is reflected either onto the screen or onto a mirror, wherein the mirror reflects the light onto the layer formed by droplets of printing material. In particular it is provided that the mirror is arranged at the nozzle or at the print head of the inkjet printer. Consequently the mirror changes its location during the printing process. According to this embodiment of the present invention it is considerable that the mirror elements are time dependently orientated such that the mirror stays illuminated during the printing process although the mirror moves.

According to a preferred embodiment of the present invention it is provided that the screen is a second mirror, wherein the second mirror reflects the light onto a second layer including droplets. Therefore it is advantageously possible to use light that is absorbed by the screen otherwise. This embodiment represents an extra economical method for printing three-dimensional light-guiding structures. It is also considerable that the cured second layer forms a part of a second three-dimensional light-guiding structure, wherein the second three-dimensional light-guiding structure is the negative of the three-dimensional light-guiding structure cured by light reflected from the mirror. It is also thinkable that the second mirror directs light to a already printed three-dimensional structure for a post curing process or a final hardening process. According to a preferred embodiment of the present invention it is provided that a lens, a further fiber mean and/or a filter are arranged between the mirror and the layer, which is formed by droplets of printing material and/or the second mirror and the second layer which is formed by droplets of printing material. In such an embodiment of the present invention it is possible to further optimize the light properties for the curing process, advantageously. For example it is possible to filter wavelength components of the light that are unsuitable for curing the droplets of printing material. It is also considerable to focus the light using a lens in order to increase the intensity of the light within the plane including the layer.

According to a further embodiment of the present invention it is provided that the mirror and/or the second mirror are a curved mirror. An advantage of using curved mirrors is the ability to focus the light onto the layer and therefore increasing the intensity of the intensity profile. In particular no lens for focusing is needed and therefore the light does not need to pass an optical element that may negative influence the light properties.

According to a further embodiment of the present invention it is provided that the mirror is arranged at the nozzle or at the print head of the inkjet printer, wherein the nozzle or the print head of the inkjet printer is moved during the first step, and at least one mirror element is re-orientated such that the light is reflected on the mirror during the second step. It is herewith advantageously possible to print a three-dimensional light-guiding structure, wherein only the print head and the mirror are moved and not the light source and the array of mirror elements. Thus the accuracy of printing may be increased, because the number of elements moving relative to each other is reduced. It is also thinkable that the array of mirror elements is attached to the print head and the light from the light source is guided to the print head by a further fiber mean. As a result it is possible to locate the light source in such a distance from the print head that no heat effect caused by the light source can influence the print head or the printing process. Additionally it is advantageously possible to optimize an angle of incident in order to reduce a cure delay, wherein the angle of incident is defined by the direction of the beam directed to the layer of droplets and the layer or the substrate respectively. According to the state of the art the light source is usually placed far away from the printing head and consequently the angle of the incident is small and therefore the cure delay is big. In contrast to the state of the art it is possible to increase the angle of incident advantageously.

Another subject of the present invention is a print head, in particular a print head comprising a mirror, used in a method described above.

It is herewith advantageously possible to realize a three-dimensional light-guiding structure. In particular the print head is able to deposit the droplets of printing material that are provided for curing with light adapted according to a method described above. Using such a print head makes it possible to deposit such droplets of printing material that are provided for curing. As a result the printing material is limited to the most necessary and thus no printing material is wasted. Furthermore it is possible to tune the light with respect the properties of the droplets of printing material and thus with respect to the properties of the print head that deposits the droplets. As a result the accuracy of the printing process may be improved, advantageously.

Another subject of the present invention printed article comprising a three-dimensional light guiding structure printed by a method described above.

Such a printed article has the advantage of being manufactured with an effective and precise method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1:
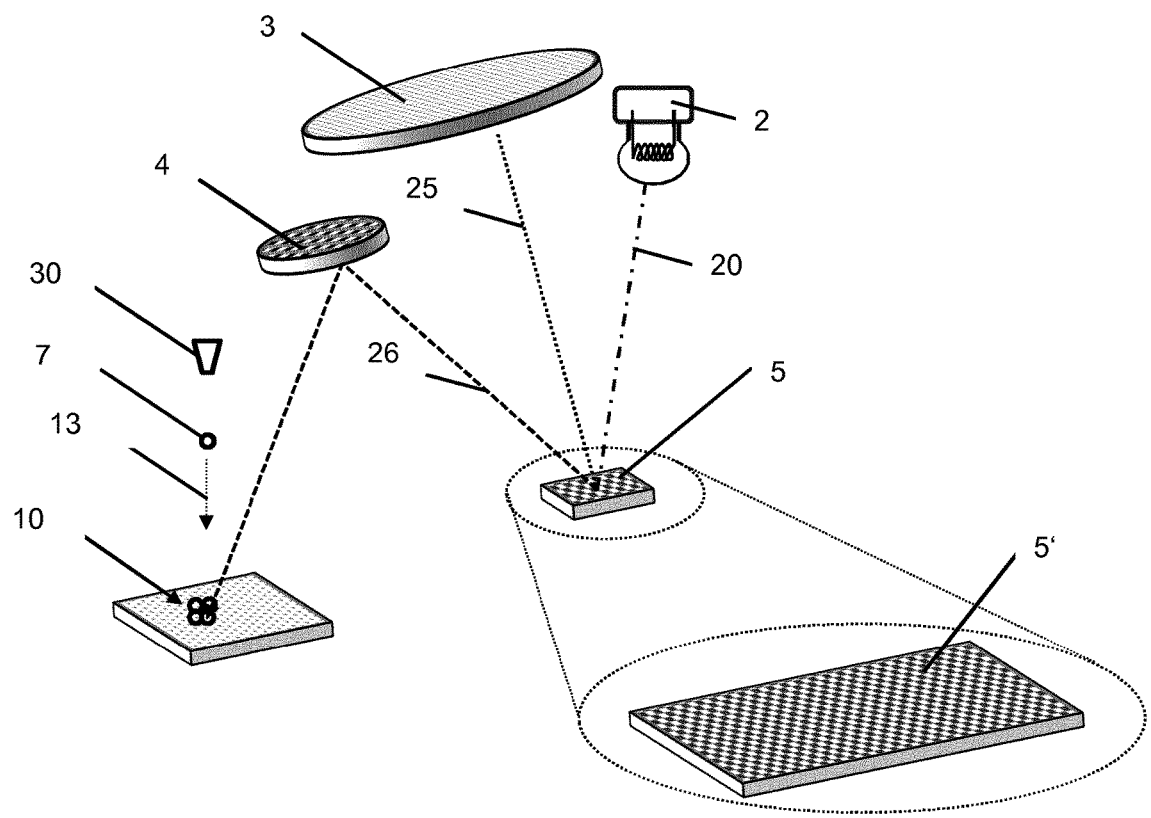
FIG. 1 illustrates a method for printing a three-dimensional light guiding structure according to a first exemplary embodiment of the present invention.

The present invention will be described with respect to particular embodiments and with the reference to certain drawings but the invention is not limited thereto but only by the claims. The drawings described are only schematic and are non-limiting. In the drawings, the size of some elements may be exaggerated and not drawn on scale for illustrative purposes.

Where an indefinite or definite article is used when referring to a singular noun, e. G. "a", "an", "the", this includes a plurals of the noun unless something else is specifically stated.

Furthermore, the terms first, second, third and the like in the description and in the claims are used to distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1 a method of printing a three-dimensional light guiding device according to a first embodiment of the present invention is shown. It is provided, that a plurality of droplets 7 of printing material are deposited on a substrate 9 and subsequently cured using light 20, in particular UV-light. As a result the cured droplets generate a body 8. Preferably it is provided that the process of depositing the droplets 7 onto the substrate 9 and/or the body 8 and subsequently curing the droplets 7 is repeated iteratively till the body 8 becomes the three dimensional light-guiding structure 1. For depositing the droplets 7 on the body 8 and/or the substrate 9 a nozzle 30 may be used. The nozzle 30 ejects printing material in shape of droplets 7 toward the substrate 9 and/or the body 8. In particular the printing material may be ejected by a print head of an inkjet printer, wherein the print head is moveable and distributes the droplets 7 of the printing material such that a layer 10 including a plurality of droplets 7 is formed. A layer 10 corresponds to an arrangement of droplets 7 within a plane that is more or less parallel to the substrate 9 and/or the body 8, for instance. In particular it is also considerable that the nozzle 30 or the head of the inkjet printer moves and consequently several droplets 7 are arranged next to each other forming the layer 10. Preferably the droplets 7 forming the layer 10 may contact each other or form at least partially a continuous structure because the droplets 7 spread or diffuse before curing. According to the present invention it is provided that light 20 from a light source 2 cures the droplets 7. Furthermore it is provided, that the light 20 of the light source 2 propagates from the light source 2 to an array 5 of mirror elements 6. The array 5' is depictured enlarged in FIG. 1 in order to illustrate that the mirror elements 6 are arranged homogeneous and checkered in the presented embodiment. At least one of the mirror elements 6 of the array 5 can be orientated such that light is reflected from the mirror element 6 either onto a screen 3 or onto a mirror 4. In particular the mirror elements 6 are microscopically small mirrors that can be tilted and the array 6 is embedded in a chip, such as a DLP-chip. Preferably each mirror element 6 is orientated in a first position or a second position, wherein the mirror element 6 in the first position is tilted with respect to the mirror element in the second position. As a result the light 20 that is directed from the light source 2 to one of the mirror elements 6 in the first position is reflected onto the screen 3, whereas the light that is directed from the light source 2 to one of the mirror elements 6 in the second position is reflected onto the mirror 4. It is also considerable that each mirror element 6 can be orientated at least in a third position, tilted with respect to the first position and the second position respectively. Furthermore it is possible to transform each mirror element 6 from its first position to its second position or vice versa. Preferably a control device, such as a computer, organizes or defines the position of each mirror element 6 during the process of printing the three-dimensional light guiding structure 1. Furthermore it is provided that the light 26 that propagates from the array 5 to the mirror 4 is reflected by the mirror onto the layer 10 formed by the droplets. Preferably the mirror 4 is pivoted such that light reflected from the mirror 4 can be reoriented or redirected to the layer 10 by pivoting the mirror 4. Such a redirection might be necessary, if the layer 10 is slightly shifted with respect to its expected position as a result of fluctuation during the manufacturing process. Further it is provided that rapidly toggling the mirror elements 6 between the first position and the second position produces different intensities, controlled by the ratio of time in the first position and time in the second position. In particular the mirror elements 6 are arranged such that an intensity profile is generated in a plane including the layer 10.

Figure 2:
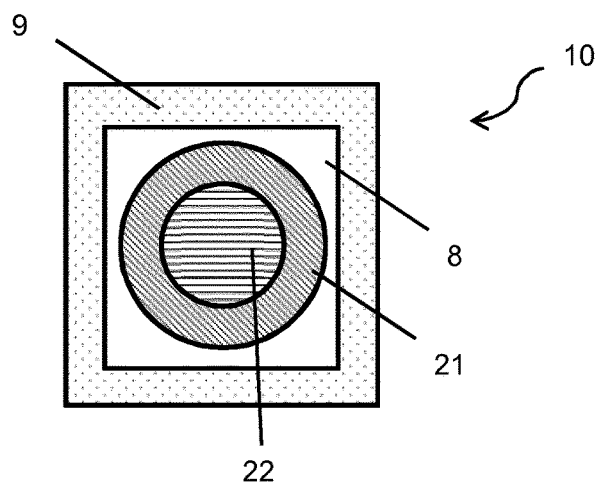
FIG. 2 illustrates a top view of a body illuminated with a light profile generated according to a second exemplary embodiment of the present invention.

FIG. 2 shows a top view of a body 8 illuminated with a light profile generated according to a second exemplary embodiment of the present invention. It is provided in the second embodiment that the mirror elements 6 are orientated or tilted such that the intensity profile comprises a first section 21 and a second section 22, wherein the first section 21 has a first intensity and the second section has a second intensity. In particular it is provided that the first intensity differs from the second intensity. Such an intensity profile might be desirable, if it is known that the layer 10 is not homogenously and therefore some regions need a higher intensity for curing compared to other regions of the layer 10. In another situation it might be desirable that a first region of the layer 10 is cured slower than a second region of the layer 10, because it is intended that the droplets 7 from the first region 21 spread more than the one from the second region 21. In FIG. 2 the illustrated intensity profile has a circular first section 21 and a circular second section 22, wherein the circular second section 22 surrounds the circular first section 21. In particular it is provided that the light having a light profile is absorbed by the printing material arranged on top of the body 8. Preferably the mirror elements 6 are orientated such that only the layer 10 is illuminated and not the body 8 or the substrate 9. As a result the probability of destroying the body 8 and/or the substrate 9 is reduced, advantageously.

Figure 3:
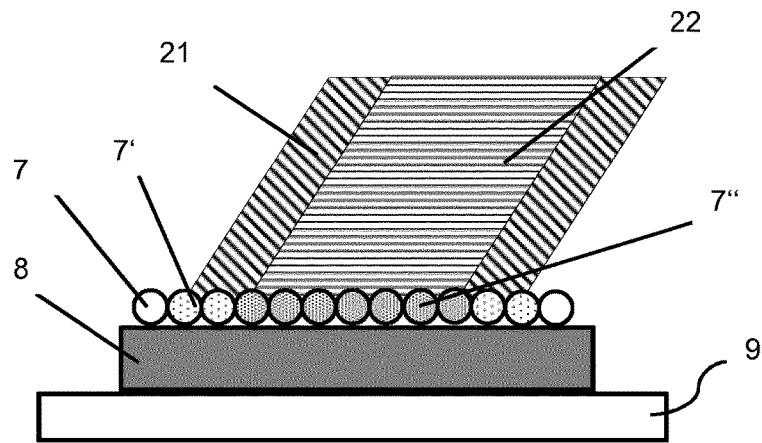
FIG. 3 illustrates a side view of a body illuminated with a light profile generated according to the second exemplary embodiment of the present invention.

FIG. 3 shows a side view of the body 8 illuminated with a light profile generated according to the second exemplary embodiment of the present invention. The body 8 is arranged between the substrate 9 and the layer 10 that comprises droplets 7 of printing material. It is provided that the droplets 7 of printing material are cured by light, wherein the light has the intensity profile comprising the first and the second section 21 and 22. Due to this intensity profile a first group of droplets 7" are illuminated by a greater intensity than a second group of droplets 7'. It is considerable that the droplets of the first group 7" absorb more light than the droplets of the second group 7' and consequently cure faster than the droplets of the second group 7'. It is also considerable that a third group 7 of droplets is not illuminated by light from the light source 2 and the droplets of the third group 7 are not cured consequently.

Figure 4:
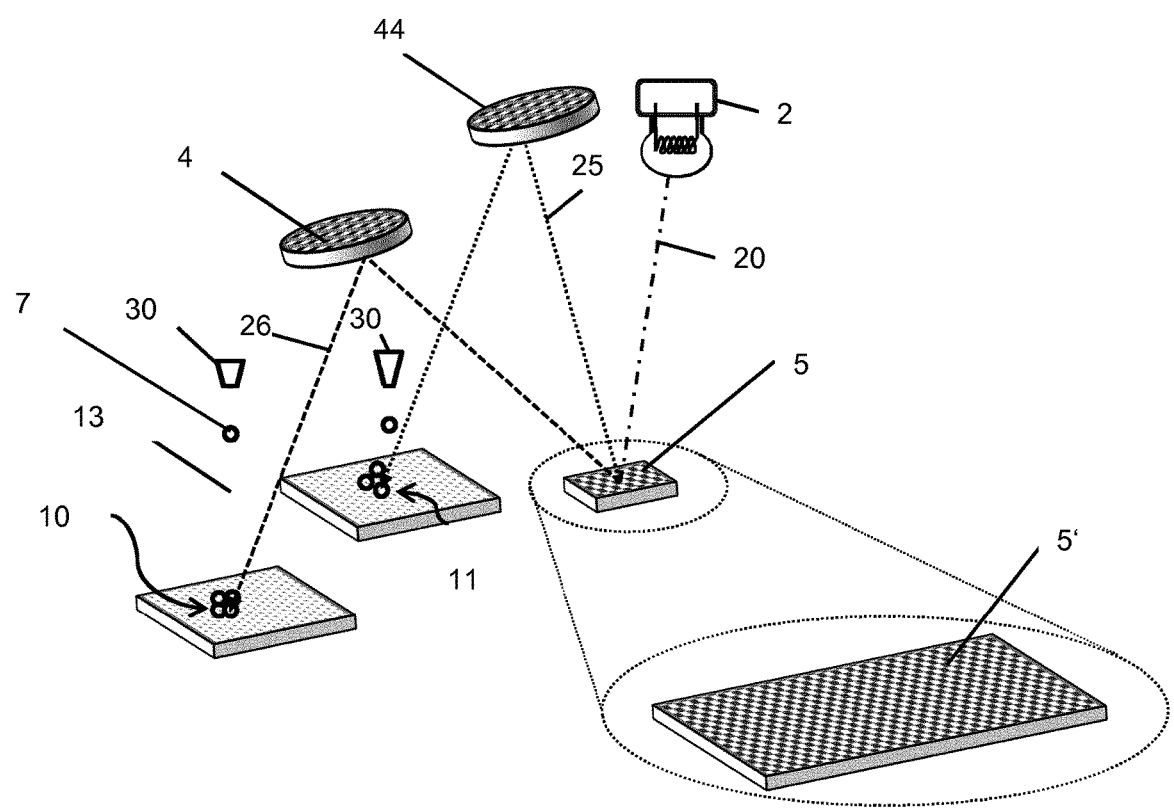
FIG. 4 illustrates a method for printing a three-dimensional light guiding structure according to a third exemplary embodiment of the present invention.

In FIG. 4 a method of printing a three-dimensional light guiding structure 1 according to a third embodiment of the present invention is shown. According to the third embodiment it is provided that the absorbing screen 3 of the first embodiment is replaced by a second mirror 44. The second mirror 44 reflects light onto a second layer 11 comprising droplets 7 of printing material. Consequently it is advantageously possible to use for curing such light that would be absorbed by the screen 3 otherwise. In particular the light is reflected from the mirror elements 25 orientated in the first position onto the second mirror. It is considerable that in the presented embodiment a second three-dimensional light-guiding structure is generated from the second layer 11 of droplets that is mainly the negative of the three-dimensional structure generated from the layer 10 of droplets. Alternatively the light directed to the second mirror 44 is manipulated or redirected such that the light may be used for printing a third three-dimensional light-guiding structure, wherein the third three-dimensional light-guiding structure has a shape different from the shape of the three-dimensional light-guiding structure 1.

Figure 5:
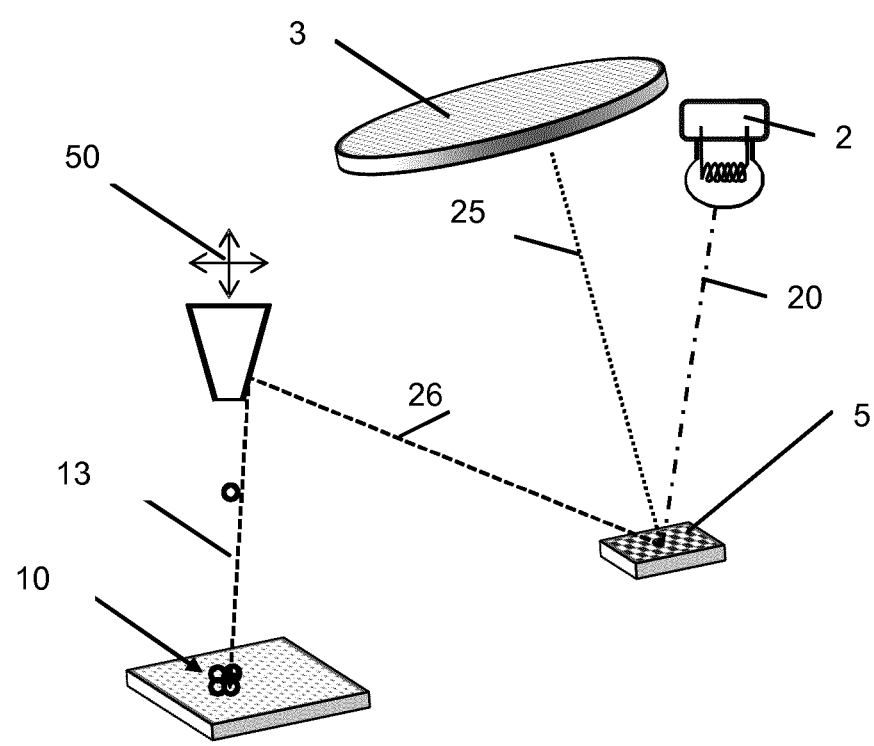
FIG. 5 illustrates a method for printing a three-dimensional light guiding structure according to a forth exemplary embodiment of the present invention.

In FIG. 5 a method of printing a three-dimensional light guiding 1 device according to a forth embodiment of the present invention is shown. According to the forth embodiment it is provided that the mirror 4 is arranged at the nozzle 30 and the nozzle 30 is moved along a direction 50 during the process of depositing the droplets 7, wherein the depositing the droplets 7 forms the layer 10. Preferably it is provided that the mirror elements 6 are orientated such that the light reflected from the mirror elements 6 follows the movement of the mirror 4 and illuminates the mirror 4 stationary (i.e. the illumination is constant with respect to the time), wherein the light source 2 and the array 4 are fixed. Consequently the intensity profile in a plane including the layer 10 stays constant even when the print head comprising the mirror 4 is moved.

REFERENCE SIGNS 1 three-dimensional light guiding structure
2 light source
3 screen
4 mirror
5, 5' array of mirror elements
6 mirror element
7, 7', 7" droplets
8 body
9 substrate
10 layer
11 second layer
13 flight direction of the droplets
20 light
21 first section
22 second section
25 light reflected onto the screen
26 light reflected onto the mirror
30 nozzle
44 second mirror
50 direction of the nozzle

The invention claimed is:

1. A method for printing a three-dimensional light guiding structure by curing droplets of a printing material by light irradiation, wherein:
   in a first step, the droplets of printing material are deposited by a nozzle or a print head of an inkjet printer such that the droplets of printing material form a layer; and
   in a second step, light is directed from a light source to:
      an array, wherein the array comprises a plurality of mirror elements,
   wherein at least one mirror element of the array can be orientated such that the at least one mirror element of the array reflects indirectly or directly light onto a screen,
   wherein each mirror element is transformed from a first position to a second position and vice versa, and
   wherein the light that is directed from the light source to one of the mirror elements in the first position is reflected onto the screen, whereas the light that is directed from the light source to one of the mirror elements in the second position is reflected onto a curing mirror and reflected onto the droplets by the curing mirror and cures the droplets.

2. The method according to claim 1, wherein the mirror elements of the array are arranged such that an inhomogeneous intensity profile is generated in a plane including the layer formed by the droplets of printing material.

3. The method according to claim 1, wherein the mirror elements of the array are orientated during the process of printing the three-dimensional light guiding structure.

4. The method according to claim 1, wherein the light source emits cw or pulsed UV-light and/or wherein a plurality of light sources are used.

5. The method according to claim 1, wherein orientation of each mirror element is computer-controlled.

6. The method according to claim 2, wherein the mirror elements of the array are orientated such that the intensity profile comprises a first section and a second section, wherein a first intensity of the first section differs from a second intensity of the second section.

7. The method according to claim 6, wherein the mirror elements are arranged such that the intensity profile comprises a third section, wherein the third section is placed between the first section and the second section, and wherein intensity within the third section gradually changes from the first intensity to the second intensity.

8. The method according to claim 2, wherein the mirror elements are orientated such that the intensity profile corresponds to a cross section of the three-dimensional light guiding structure.

9. The method according to claim 1, wherein at least one mirror element of the array is orientated such that the light is reflected onto an additional curing mirror, wherein the additional curing mirror reflects the light onto the layer formed by the droplets of printing material.

10. The method according to claim 9, wherein at least one mirror element of the array is orientated such that the light is reflected onto a second additional curing mirror, wherein the second additional curing mirror reflects the light onto a second layer formed by the droplets of printing material.

11. The method according to claim 10, wherein a lens, a fiber means and/or a filter is arranged between:
   the additional curing mirror and the layer formed by the droplets of printing material,
   the second additional curing mirror and the second layer formed by the droplets of printing material,
   the light source and the array of mirror elements, and/or
   a further light source and second array mirror elements.

12. The method according to claim 10, wherein the additional curing mirror and/or the second additional curing mirror is a curved mirror.

13. The method according to claim 9, wherein the additional curing mirror is arranged at the nozzle or the print head of the inkjet printer, wherein the nozzle or the print head of the inkjet printer is moved during the first step, and at least one mirror element is re-orientated such that the light is reflected on the additional curing mirror during the second step.

14. The method according to claim 3, wherein the mirror elements of the array are orientated during illuminating the layer formed by the droplets of printing material.

15. The method according to claim 1, wherein a second array of mirror elements reflects light from a further light source onto the layer formed by the droplets of printing material.

* * * * *